May 19, 1942.   D. P. JACOBUS   2,283,634
BEAM LOCKING DEVICE
Filed Dec. 2, 1940   2 Sheets-Sheet 1

INVENTOR.
DALE P. JACOBUS
BY
ATTORNEY.

INVENTOR.
DALE P. JACOBUS
BY
ATTORNEY.

Patented May 19, 1942

2,283,634

UNITED STATES PATENT OFFICE 2,283,634

BEAM LOCKING DEVICE

Dale P. Jacobus, St. Johnsbury, Vt., assignor to Fairbanks, Morse & Co., Chicago, Ill., a corporation of Illinois Application December 2, 1940, Serial No. 368,135

2 Claims. (Cl. 265—49)

This invention relates to scales and more particularly to improved means for locking or immobilizing the weighing beam of a scale.

The principal object of my invention resides in the provision of means for protecting the delicate weighing and indicator mechanism of a scale against injury, such, for example, as might be caused by abnormal forces resulting from impact of a load on the scale platform. This object is accomplished by the means of my invention which operates in an improved manner to immobilize the scale beam, except when it is desired to take a reading, whereby to prevent the transmission of impact forces to the delicate weighing and indicator mechanism.

Further objects and advantages attained by the invention will appear readily from the following description of a preferred embodiment thereof, as illustrated in the accompanying drawings, in which.

Figure 1:
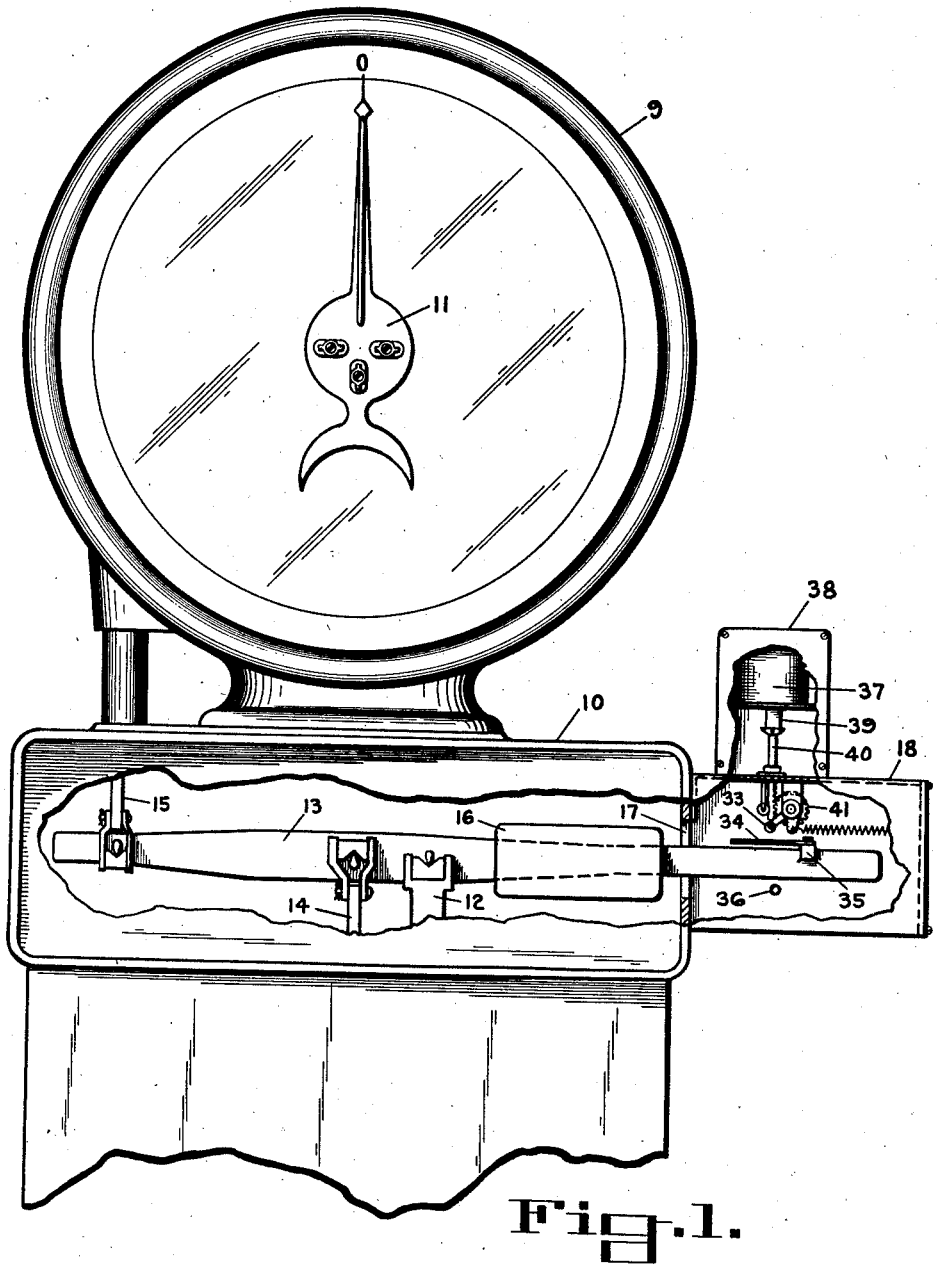
Fig. 1 is a front elevation of a weighing scale with housing members broken away to show the means of the invention and the scale elements acted on thereby.

Referring now by characters of reference to the drawings, numeral 9 designates a dial head of a weighing scale mounted on a beam housing 10, the dial being provided with a rotatable indicator 11 controlled by the usual dial mechanism. Mounted in the beam housing 10 on a pivot and bearing assembly 12 is an oscillatory beam 13 adapted to be controlled by the scale lever mechanism, not shown, through a steelyard rod 14, a draft rod 15 being provided to transmit the movement of the scale beam to the dial mechanism. For balancing purposes the beam is also provided thereon with a weight 16.

The beam 13 is made in such a manner that its free end is adapted to project through an opening 17 in the end of the beam housing 10 and into another housing 18 attached to the end of the beam housing. The means for locking the beam is provided in the housing 18 and comprises a depending bearing arm 19 in which is journalled one end of a shaft 20, the other end being journalled in the back wall of the housing 18. Two spaced hubs 21 and 22 are fixedly mounted on the shaft 20 by taper pins 23 and each hub is provided with an extension 24 to each of which is connected one end of a tension spring 25, the opposite ends of the springs 25 being attached by suitable means such as studs 26 to a cross bar 27 which is mounted by means of screws 28 across the end of the housing 18.

Also fixedly mounted on the shaft 20 by a taper pin 29 is a trig 30, the arms of which support a shaft 32 that carries a roller 33. Roller 33 is adapted to engage a flat plate or strip 34 which is secured at one end to a lug 35 formed on beam 13.

Figure 2:
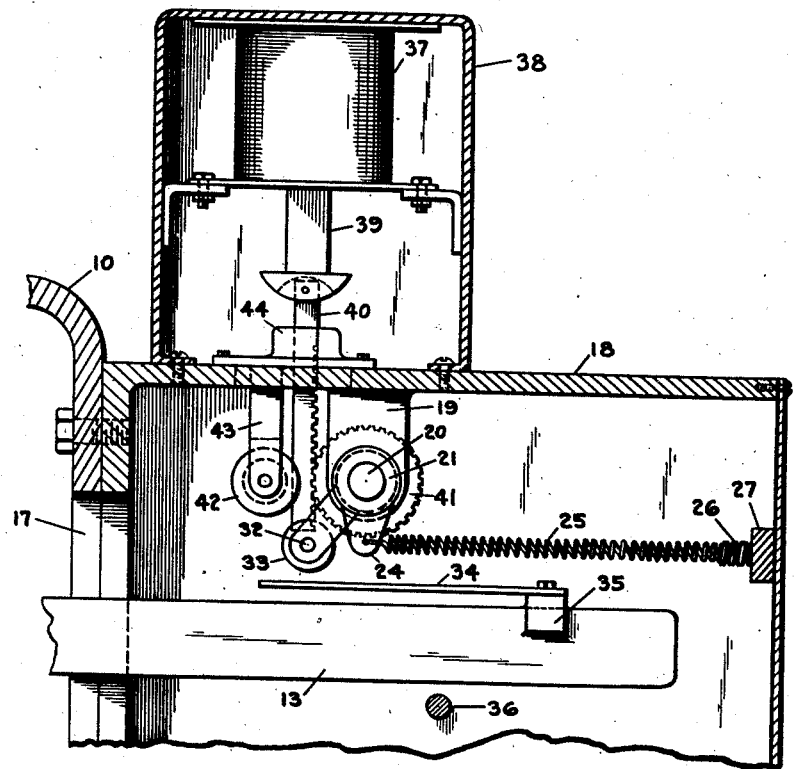
Fig. 2 is an enlarged front elevational view of the invention with the housings in section.
Figure 3:
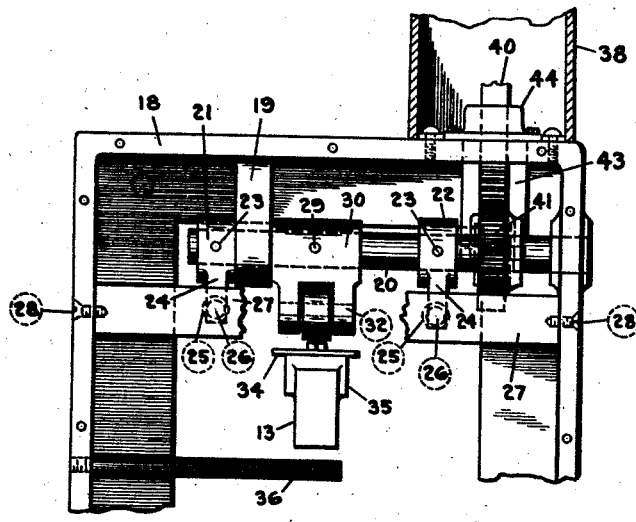
Fig. 3 is an end view of the invention with the end cover plate removed and the solenoid housing in section.

Springs 25 tend to rotate shaft 20 in a counterclockwise direction (Fig. 2), and thus to urge roller 33 into bearing engagement with strip 34. The scale beam is thus adapted to be clamped between roller 33 and a fixed stop pin 36, strip 34 acting in the manner of a leaf spring to cushion the impact of roller 33.

To unlock the beam a solenoid 37 is provided, mounted in a small casing 38 secured to the top of the housing 18. The movable core member 39 of the solenoid, upon energization of its coil, raises a rack member 40, pivotally attached to the core member 39, which extends downwardly through an opening in the top of the housing 18. The teeth on the rack member 40 mesh with the teeth on a gear wheel 41 keyed to shaft 20, and are held from becoming disengaged therewith by a rimmed wheel 42 engaging the back of the rack member. The wheel 42 is rotatably mounted in the lower end of a depending arm 43 of a guide bracket 44 secured to the top of the housing 18, the bracket 44 being provided with an opening through which the depending rack 40 extends.

Thus, upon energization of the solenoid 37 the core member 39 will be drawn upwardly as will the rack member 40, causing rotation of the gear wheel 41 and consequently the shaft 20, which will thereby also rotate the trig 30 to raise the roller wheel 33 from the plate 34, freeing the beam 13. It will be seen that the rotation of the shaft 20 by the solenoid operated mechanism is directly against the tension of the springs 25, causing them to be extended. However, when the solenoid is deenergized the springs will act to again rotate the shaft 20 and lock the beam.

From the foregoing description it will be seen that a weighing scale beam may be locked between weighings and during the loading of the scale platform, thus preventing any great shock from being transmitted to the dial mechanism. However, upon the energizing of a solenoid, which may be done upon the mere operation of a push button or other suitable type of switch, the beam will become unlocked and free to operate, and at the end of the weighing operation the solenoid may become deenergized to again lock the beam and protect the delicate dial mechanism from possible damage.

While certain novel features of the invention have been shown and described and are pointed out in the annexed claims, it will be understood that various changes in the forms and details of the device illustrated and in its operation may be made by those skilled in the art without departing from the spirit of the invention.

I claim as my invention:

1. In a scale having a weigh beam, means forming an abutment for the beam at one side thereof, a yieldable striker plate on said beam, a roller, means pivotally mounting said roller for movement into and out of engagement with said striker plate, a spring adapted to urge said roller into engagement with said striker plate, and electromagnetic means for withdrawing said roller from the striker plate to free the weigh beam.

2. In a scale having a weigh beam, a locking device for said beam comprising a yieldable striker plate carried by the beam, means forming an abutment for the beam, a shaft extending transversely of the beam, a radial arm on said shaft, a roller on the outer end of said arm, adapted to engage said striker plate, a spring acting on said shaft and tending to rotate the same in a direction to swing said roller into engagement with said striker plate, whereby to force the beam against said abutment, means for retracting said roller whereby to free the beam, said means comprising a gear wheel keyed to said shaft, a rack member coacting with said gear wheel, and electromagnetic means operatively connected to said rack.

DALE P. JACOBUS.